United States Patent

[11] 3,590,239

[72] Inventor Christian Louis Georges Benard
Paris, France
[21] Appl. No. 737,614
[22] Filed June 17, 1968
[45] Patented June 29, 1971
[73] Assignee Societe Parisienne Des Anciens
Establissments Barbier Bernard & Turenne
Paris, France

[54] RADIATION CONDENSERS
5 Claims, 3 Drawing Figs.

[52] U.S. Cl. .......... 240/41.3,
240/1.1, 240/41.1, 240/41.35 R, 352/203
[51] Int. Cl. .......... 353 102,
F21v 13/04
[50] Field of Search .......... 240/41.35,
41.3, 41.1, 1.1; 353/102; 352/198, 203

[56] References Cited
UNITED STATES PATENTS

| | | | |
|---|---|---|---|
| 1,277,109 | 8/1918 | Patterson | 240/41.1 (X) |
| 3,225,188 | 12/1965 | Le Vantine | 240/41.3 (X) |
| 3,321,620 | 5/1967 | Miles et al. | 240/41.3 |
| 3,387,128 | 6/1968 | Benard | 240/41.3 |

*Primary Examiner*—Samuel S. Matthews
*Assistant Examiner*—Robert P. Greiner
*Attorney*—Karl W. Flocks

ABSTRACT: A radiation condenser device enabling irradiated surfaces to be lighted uniformly, for instance intended for solar simulation, comprising two rings centered on the optical axis around one light source and having an equal number of elementary condenser devices each comprising a condenser lens, a planar mirror and an objective lens so that all the images of said elementary devices coincide, whereby the irradiated surface is uniformly lighted.

Inventor:
Christian Louis Georges Banard
By
Karl W. Flocks
attorney

Inventor
Christian Louis Georges Renard
By
Karl W. Flocks
Attorney

RADIATION CONDENSERS

The present invention concerns a variant of an improved radiation condenser such as is described in the applicant's U.S. Pat. No. 3,387,128 and pending application Ser. No. 623,695 filed on the 16th of Mar. 1967 and now U.S. Pat. No. 3,501,626 issued Mar. 17, 1970, and which is intended in particular for the construction of a solar simulation optical device.

In the above-mentioned applications, description has been made of an improved condenser comprising essentially at least one light source and a certain number of elemental small aperture condenser systems, uniformly illuminated; each comprising, for example, a condenser lens and an objective which is itself placed on the image of the source through the condenser lens or in a neighboring plane; the objective itself forming the image of the uniformly illuminated condenser lens on the surface to be irradiated, and the elemental systems being interassociated so that all the said images of each condenser lens through each objective lens overlay each other thus furnishing uniform illumination of the surface under irradiation; each elemental system capturing part of the flux emitted by the source and being able to permit individually a modification of the spectrum of the resulting radiant flux.

Eight identical elemental condensers, distributed symmetrically around the source are arranged to advantage on a ring concentric with the optical axis of the assembly; the optical axis passing through the center of the surface to be irradiated.

In one preferred form of construction, each elemental condenser system comprises a light source behind which is placed a spherical mirror centered on the latter; a small aperture condenser lens and an objective placed on the image of the source through the said lens; the objective forming the image of the latter on the irradiated surface by receiving the beam emerging from the lens by reflection on a suitably inclined plane mirror.

The applicant has now found that it was possible to make better use of the light energy emanating from the source by modifying the elemental condensers and their arrangement.

To this end, the device according to the present invention is characterized by the fact that each elemental condenser is constituted by the light source, a condenser lens, a suitably inclined plane mirror placed behind the latter and an objective lens to focus the image of the source through the condenser lens, transmitted by reflection onto the said plane mirror.

According to another feature, the above-mentioned elemental condensers are arranged uniformly on two superposed rings comprising the same number of elemental condensers, centered on the optical axis and of different diameters.

Other features and advantages resulting from the present invention will become more evident from the description which follows, made with regard to the accompanying drawings in which.

Figure 1:
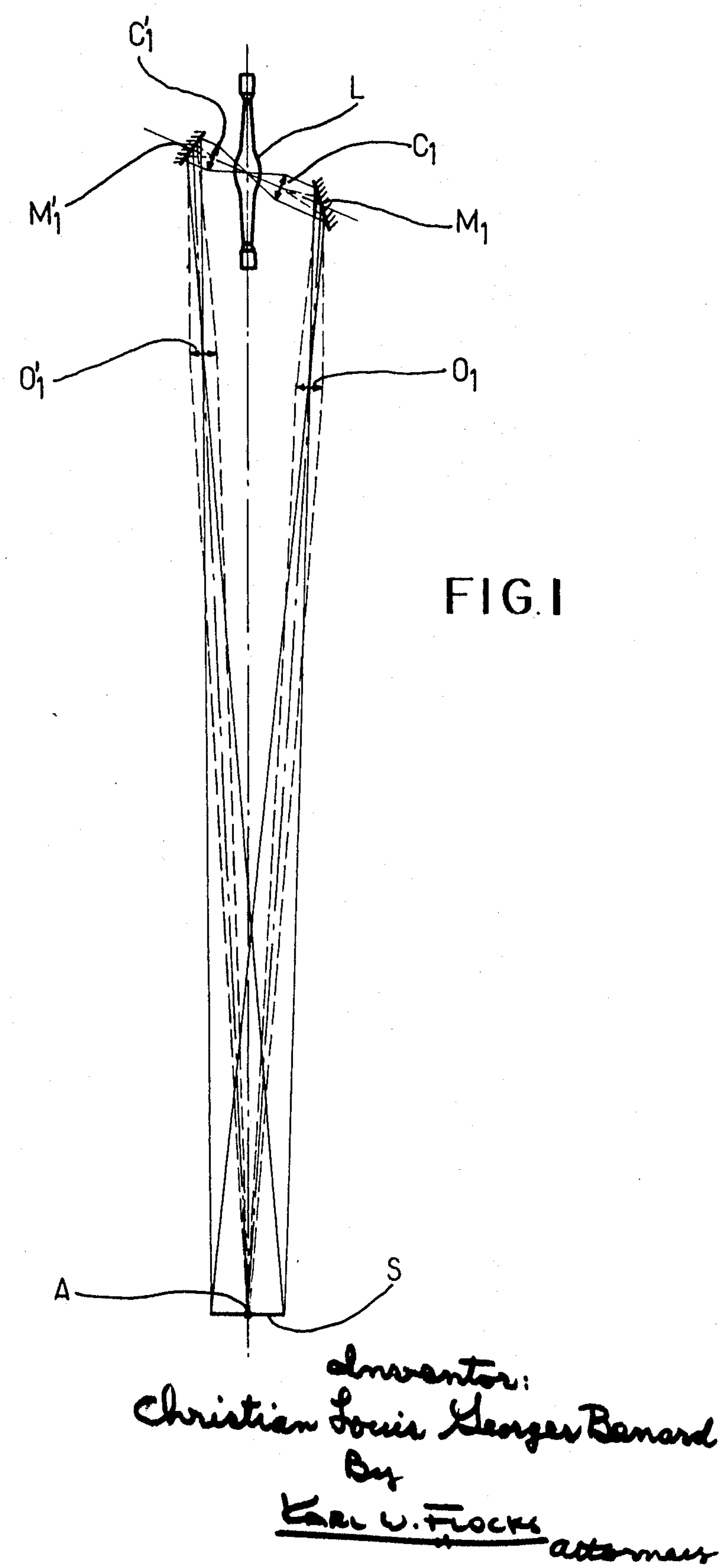
FIG. 1 is a diagrammatic drawing of one possible form of construction of the optical system in accordance with the present invention.
Figure 2:
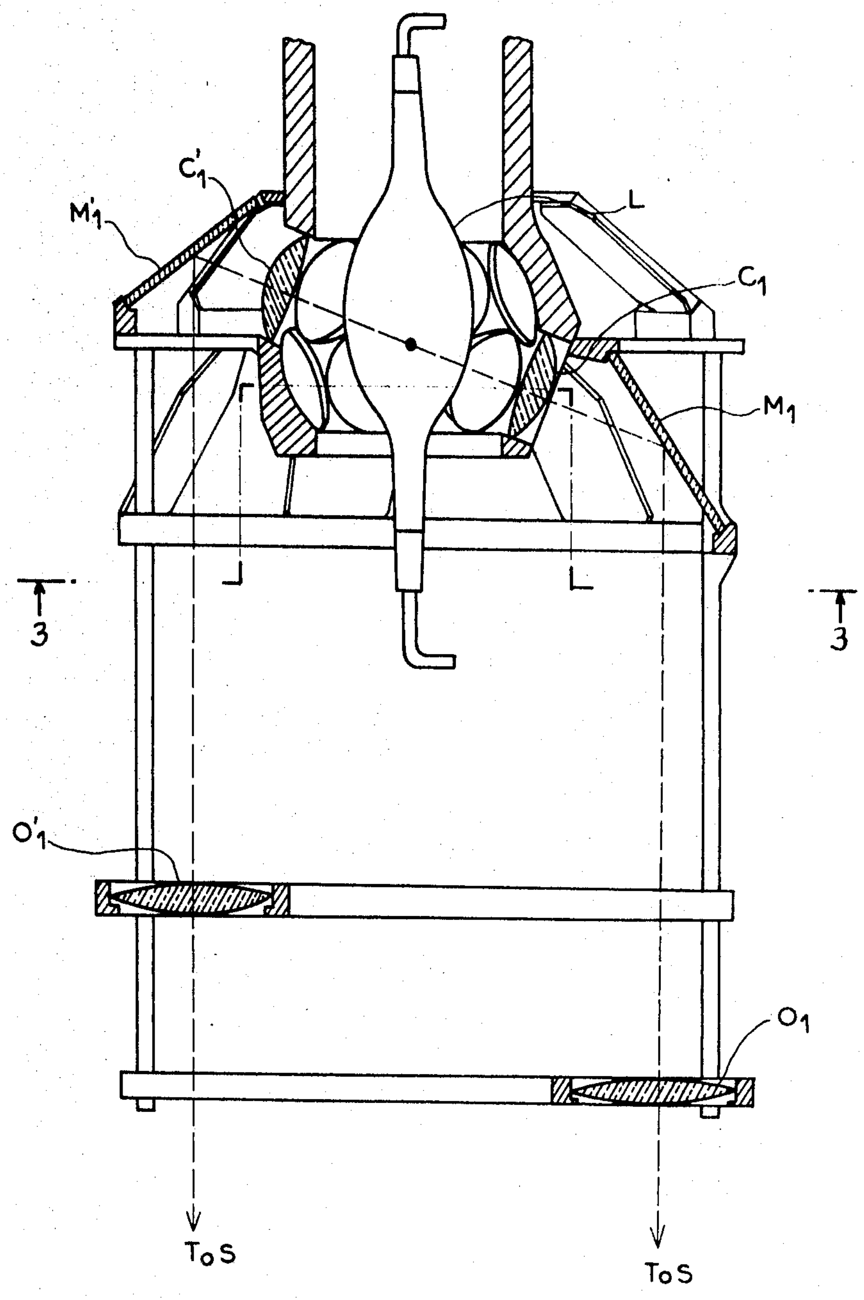
FIG. 2 is a partial sectional schematic device showing some of the construction of a system as in FIG. 1.
Figure 3:
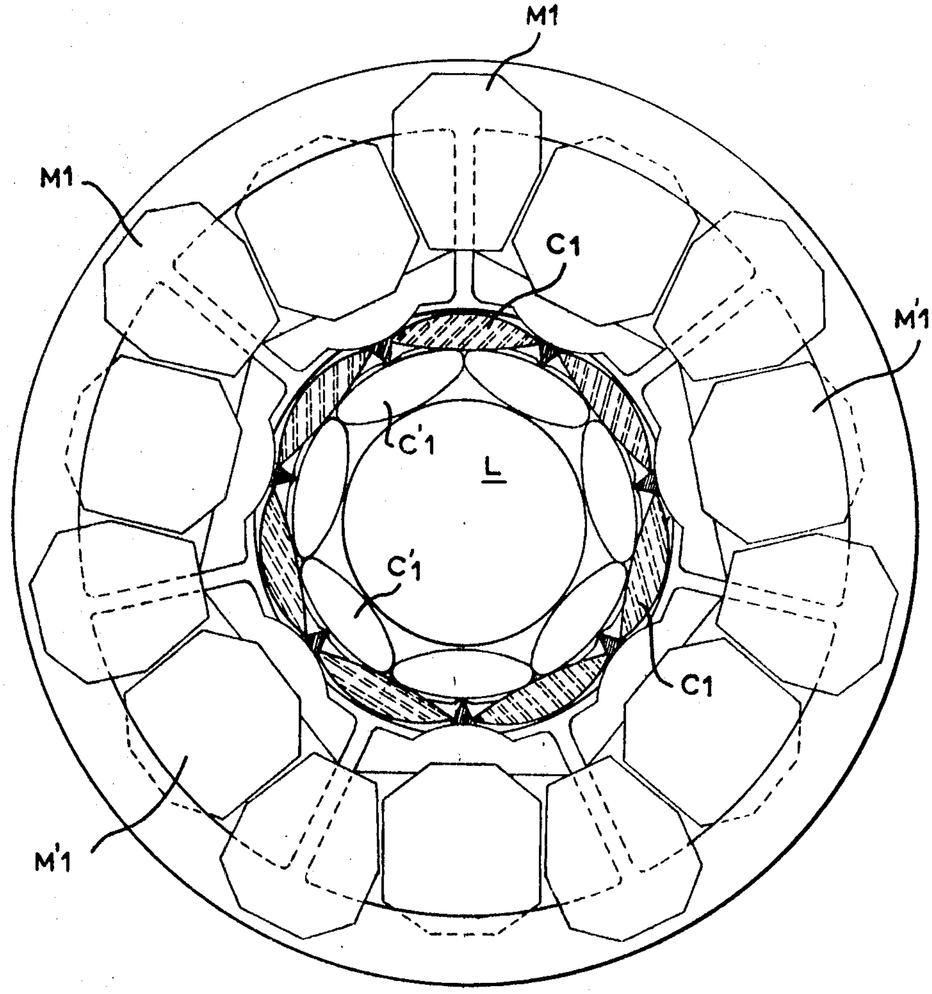
FIG. 3 is a sectional view perpendicular to the optical axis of the system along line 3–3 of FIG. 2.

With reference to the drawing, an elemental condenser system is constituted by a light source L, for example of the short-arc discharges type, a small aperture condenser lens $C_1$ the optical axis of which passes through the center of source L, this lens being uniformly illuminated by source L. Behind lens $C_1$ is placed a plane mirror $M_1$ inclined so as to reflect the rays from lens $C_1$ onto an objective $O_1$ placed on the image of source L through the said lens, this objective forming the image A of the lens or that of a neighboring plane on the irradiated surface S or in its neighborhood.

According to the invention, $n$ elemental systems such as described above are arranged uniformly on a ring centered on the optical axis passing through the center of source L and through the center of irradiated surface S and the same number of elemental systems on a second superposed ring having the same center and a different diameter and in which each elemental system is made up of the same parts, namely a condenser lens $C_1'$, a plane mirror $M_1'$ and an objective $O_1'$.

The two superposed rings of $n$ elemental systems can equally well comprise lenses of equal focal distances. In that case, the upper ring is displaced angularly with respect to the lower ring by $1/2n$ fraction of a turn, in order that the light beams issuing from each element of the upper ring may be directed towards a double ring of collector lenses where the $2n$ images of the source form.

The double ring of collector lenses $O_1$ etc. and $O_1'$ etc., forms a single image A of equal uniform illumination by focusing the images of lenses $C_1$ etc. and $C_1'$ respectively on A.

According to an advantageous method of construction, the number $n$ of elemental condenser systems constituting a ring is equal to seven.

It goes without saying that the present invention has been described and illustrated in an explanatory but by no means restrictive manner only and that any useful modification may be made to it without going beyond its scope.

I claim:

1. A radiation condenser device for irradiating a surface and intended especially for the construction of a solar simulation device comprising
   - at least one common light source,
   - a first plurality of elementary condenser systems grouped around said light source on a ring centered on the optical axis passing through the center of said light source,
   - a second plurality of elementary condenser systems grouped around said light source on a ring centered on the same optical axis and being of the same number of systems as said first plurality of elementary condenser systems,
   - each of said elementary condenser systems including
     - a condenser lens located in the path of the light from said light source,
     - a plane mirror located in the path of light from said light source on the opposite side of said condenser lens from said light source and inclined to the path of light from said condenser lens,
     - an objective lens located in the path of light from said plane mirror and positioned to focus an image on the surface to be irradiated
   - said elementary condenser systems located in relation to each other to superpose all the images therefrom on the surface to be irradiated and on at least two superposed rings.

2. A radiation condenser device in accordance with claim 1, in which the number of condenser systems is equal to seven.

3. A radiation condenser device in accordance with claim 1 in which the superposed rings have different diameters.

4. A radiation condenser device in accordance with claim 1, in which the superposed rings are of equal diameters and are then displaced angularly by $1/2n$ fraction of a turn; $n$ being the number of elementary condenser systems borne on each ring.

5. A radiation condenser device for irradiating a surface and intended especially for the construction of a solar simulation device comprising
   - at least one common light source,
   - a first plurality of elementary condenser systems grouped around said light source on a ring centered on the optical axis passing through the center of said light source,
   - a second plurality of elementary condenser systems grouped around said light source on a ring centered on the same optical axis,
   - each of said elementary condenser systems including
     - a condenser lens located in the path of the light from said light source,
     - a plane mirror located in the path of light from said light source on the opposite side of said condenser lens from said light source and inclined to the path of light from said condenser lens, an objective lens located in the path of light from said plane mirror and positioned to focus an image on the surface to be irradiated, said elementary condenser systems located in relation to each other to superpose all the images therefrom on the surface to be irradiated and on at least two superposed rings.

UNITED STATES PATENT OFFICE

CERTIFICATE OF CORRECTION

Patent No. 3,590,239 Dated June 29, 1971

Inventor(s) Christian Louis Georges BENARD

It is certified that error appears in the above-identified patent and that said Letters Patent are hereby corrected as shown below:

In column 1, lines 6 and 7, the name of the assignee should read as follows:

Societe Parisienne des Anciens Etablissements Barbier, Benard & Turenne.

Signed and sealed this 30th day of November 1971.

(SEAL)
Attest:

EDWARD M.FLETCHER,JR.
Attesting Officer

ROBERT GOTTSCHALK
Acting Commissioner of Patents